United States Patent
Ku

(10) Patent No.: US 9,026,183 B2
(45) Date of Patent: May 5, 2015

(54) SYSTEM AND METHOD FOR MAKING A CALL VIA SPEAKERPHONE IN A MOBILE DEVICE

(75) Inventor: Do Il Ku, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 13/221,154

(22) Filed: Aug. 30, 2011

(65) Prior Publication Data

US 2012/0052925 A1 Mar. 1, 2012

(30) Foreign Application Priority Data

Aug. 31, 2010 (KR) .......................... 10-2010-0084554

(51) Int. Cl.
*H04M 1/00* (2006.01)
*H04M 1/60* (2006.01)
*H04M 1/03* (2006.01)

(52) U.S. Cl.
CPC ................ *H04M 1/605* (2013.01); *H04M 1/03* (2013.01); *H04M 2250/12* (2013.01)

(58) Field of Classification Search
CPC ............................. H04W 4/02; G06F 19/3406
USPC .................. 455/73, 550.1, 567, 575.1, 569.1, 455/238.1, 355, 566, 410, 456.1, 574, 455/556.1, 90.3, 418; 345/169, 175, 156, 345/173; 340/384.1; 379/387.01, 388.02; 348/333.01
See application file for complete search history.

(56) References Cited

U.S. PATENT DOCUMENTS

| | | | |
|---|---|---|---|
| 6,853,850 B2* | 2/2005 | Shim et al. | 455/550.1 |
| 2005/0277447 A1* | 12/2005 | Buil et al. | 455/575.1 |
| 2006/0128321 A1* | 6/2006 | Bae | 455/73 |
| 2008/0146289 A1* | 6/2008 | Korneluk et al. | 455/569.1 |
| 2009/0011798 A1* | 1/2009 | Yamada | 455/566 |

FOREIGN PATENT DOCUMENTS

| KR | 10-2004-0077192 A | 9/2004 |
|---|---|---|
| KR | 10-2006-0067378 A | 6/2006 |
| KR | 10-2007-0039638 A | 4/2007 |
| KR | 10-2007-0070895 A | 7/2007 |

* cited by examiner

*Primary Examiner* — Kiet Doan
(74) *Attorney, Agent, or Firm* — Jefferson IP Law, LLP

(57) ABSTRACT

A system and method for making a call in a speakerphone mode in a mobile device including a number of loudspeakers are provided. The system includes a sensor for detecting an orientation of the mobile device, and a controller for activating part or all of the number of loudspeakers, according to a signal sensed by the sensor, when making a call in the speakerphone mode. The system and method can activate all of the number of loudspeakers in a case where the call is made in the speakerphone mode at a higher volume level or only one loudspeaker in a case where a high quality of audio sound is desired despite the volume level being low. The system and method can automatically activate part or all of the number of loudspeakers according to the orientation of the mobile device, sensed by a sensor, thereby enhancing user convenience.

7 Claims, 4 Drawing Sheets

SYSTEM AND METHOD FOR MAKING A CALL VIA SPEAKERPHONE IN A MOBILE DEVICE

PRIORITY

This application claims the benefit under 35 U.S.C. §119(a) of a Korean patent application filed on Aug. 31, 2010 in the Korean Intellectual Property Office and assigned Serial No. 10-2010-0084554, the entire disclosure of which is hereby incorporated by reference.

BACKGROUND OF THE INVENTION

1. Field of the Invention

The present invention relates to mobile communication systems. More particularly, the present invention relates to a system and method that can activate one or more loudspeakers included in a mobile device, according to a user's selection, in order to make a call in a speakerphone mode.

2. Description of the Related Art

With the rapid development of information and communication technology and semiconductor technology, the use of various types of mobile devices has also increased. The trend in mobile devices is toward the convergence of functions and services that historically were separately provided by diverse types of mobile devices. For example, mobile devices now include communication functions such as voice calling or message transmission, and additional functions, such as a TeleVision (TV) viewing function (e.g., mobile broadcasting, such as Digital Multimedia Broadcasting (DMB), Digital Video Broadcasting (DVB), etc.,), an audio playback function (e.g., Moving Picture Experts Group (MPEG)-1 or MEPG-2 Audio Layer 3 (MP3)), a photographing function, an Internet function, a speakerphone function, etc.

In recent years, mobile devices have been equipped with a number of loudspeakers in order to provide sufficient volume and to output stereophonic sound during audio playback. In addition, the mobile devices can also activate a number of loudspeakers to produce a higher level of audio volume while in a speakerphone mode. When the mobile devices are operated in the speakerphone mode, the sound output from the loudspeakers may be received by the microphone. This may cause echoes that deteriorate the quality of a voice call. In particular, when the microphone is located close to the loudspeakers, echoes can easily occur. In order to address these problems, mobile devices of the related art with a number of loudspeakers make a voice call via the speakerphone mode in such a manner that they activate only one loudspeaker spaced far apart from the microphone, e.g., a loudspeaker at the top of the mobile device. However, some users may prefer to hear audio at a higher level despite the audio being produced in an environment where their mobile devices output echoes via the loudspeakers. Regardless of users' preference, it may be preferable that the mobile devices activate a number of loudspeakers depending on the environment in which they are used. For example, in a silent environment, the mobile devices may make a call in the speakerphone mode by activating only one loudspeaker. However, in a noisy environment, mobile devices may have difficulty making a call in the speakerphone using only one loudspeaker. In that case, it may be preferable that the mobile devices activate a number of loudspeakers to provide a higher level of audio sound despite the occurrence of echoes. However, the mobile devices of the related art are designed to activate only one loudspeaker when making a call in a speakerphone mode.

SUMMARY OF THE INVENTION

Aspects of the present invention are to address the above-mentioned problems and/or disadvantages and to provide at least the advantages described below. Accordingly, an aspect of the present invention is to provide a system and method that can selectively activate one or more loudspeakers included in a mobile device, according to a user's selection, in order to make a call in a speakerphone mode.

Another aspect of the present invention is to provide a system and method that can automatically activate one or more loudspeakers included in a mobile device, according to the orientation of the mobile device, in order to make a call in a speakerphone mode.

In accordance with an aspect of the present invention, a method for making a call in a speakerphone mode in a mobile device including a number of loudspeakers is provided. The method includes detecting, when operating in the speakerphone mode, the orientation of the mobile device, and activating part or all of a number of loudspeakers, according to the detected orientation of the mobile device.

In accordance with another aspect of the present invention, a method for making a call in a speakerphone mode in a mobile device including a number of loudspeakers is provided. The method includes activating, when operating in a speakerphone mode, a preset number of loudspeakers, and activating, when a preset function key is operated, all of the number of loudspeakers.

In accordance with another aspect of the present invention, a system for making a call in a speakerphone mode in a mobile device including a number of loudspeakers is provided. The system includes a sensor for detecting an orientation of the mobile device, and a controller for activating part or all of the number of loudspeakers, according to a signal sensed by the sensor, when making a call in a speakerphone mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words described in the present description and the claims are not to the bibliographical meanings, but, are merely used by the inventor to enable a clear and consistent understanding of the invention. Accordingly, it should be apparent to those skilled in the art will understand that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following exemplary embodiments of the present invention, the mobile devices refer to devices that include a number of loudspeakers and support a speakerphone function. It will be appreciated that the invention can be applied to all information communication devices, multimedia devices, and their applications, for example, mobile communication terminals, smartphones, etc. For the sake of convenient description, the exemplary embodiments of the present invention will be described based on a mobile device with two loudspeakers.

Figure 1:
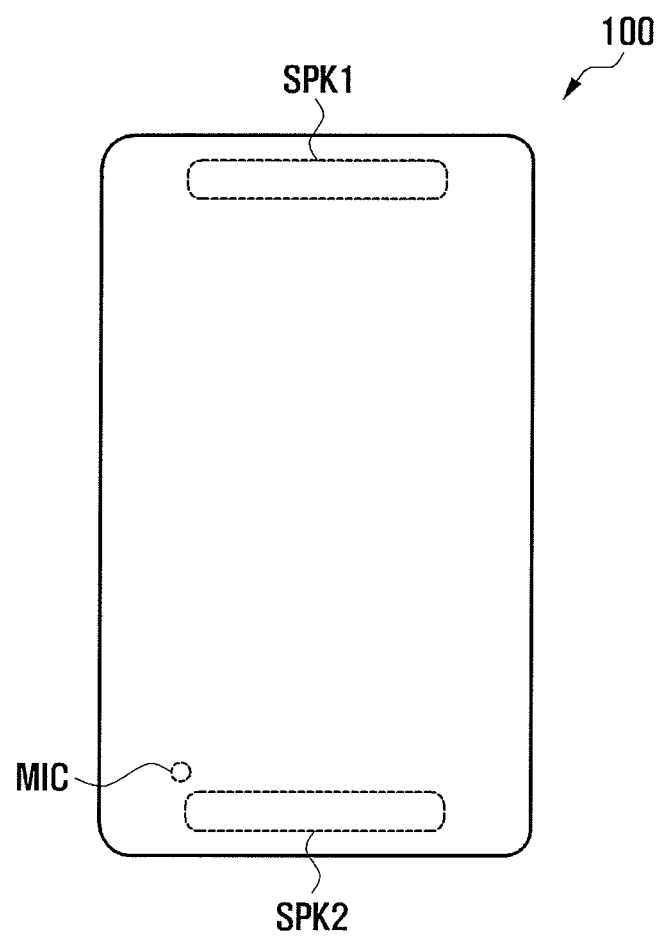
FIG. 1 illustrates a front view of a mobile device according to an exemplary embodiment of the present invention.

FIG. 1 illustrates a front view of a mobile device according to an exemplary embodiment of the present invention.

Referring to FIG. 1, the mobile device 100 includes a first loudspeaker SPK1 at a top of the mobile device 100, a second loudspeaker SPK2 at a bottom of the mobile device 100, and a microphone MIC. The second loudspeaker SPK2 may be close to the microphone MIC.

The mobile device 100 can provide a speakerphone function via the first loudspeaker SPK1 or via both the first SPK1 and second SPK2 loudspeakers. When the mobile device 100 provides the speakerphone function while in a speakerphone mode. When the mobile device 100 makes a call in the speakerphone mode by activating the first SPK1 and second SPK2 loudspeakers, the mobile device 100 can provide a higher volume level than by activating only one of the first SPK1 and second SPK2 loudspeakers. However, since the second loudspeaker SPK2 and the microphone MIC are close to each other, the microphone MIC may receive the sound output from the second loudspeaker SPK2 and this may cause echoes. That is, when the mobile device 100 makes a call in the speakerphone mode using the first SPK1 and second SPK2 loudspeakers, the call quality may be deteriorated. On the contrary, when the mobile device 100 makes a call in the speakerphone mode by activating only the first loudspeaker SPK1, it does not cause echoes. However, in that case, the mobile device 100 outputs a relatively lower volume level because of the use of only one loudspeaker.

As such, making a call in a speakerphone mode using one or two loudspeakers has advantages and disadvantages. The system and method according to an exemplary embodiment of the present invention can allow the mobile device to activate one or two speakers according to a user's preference or the peripheral environment, when making a call in the speakerphone mode. That is, the mobile device 100 can activate only the first loudspeaker SPK1 or both the first SPK1 and second SPK2 loudspeakers, according to the orientation of the mobile device 100 sensed by a sensor, when making a call in the speakerphone mode. Alternatively, the mobile device 100 can activate only the first loudspeaker SPK1 or both the first SPK1 and second SPK2 loudspeakers, by operating a preset function key, when making a call in the speakerphone mode. These will be described in detail below with reference to FIGS. 2 to 4.

Figure 2:
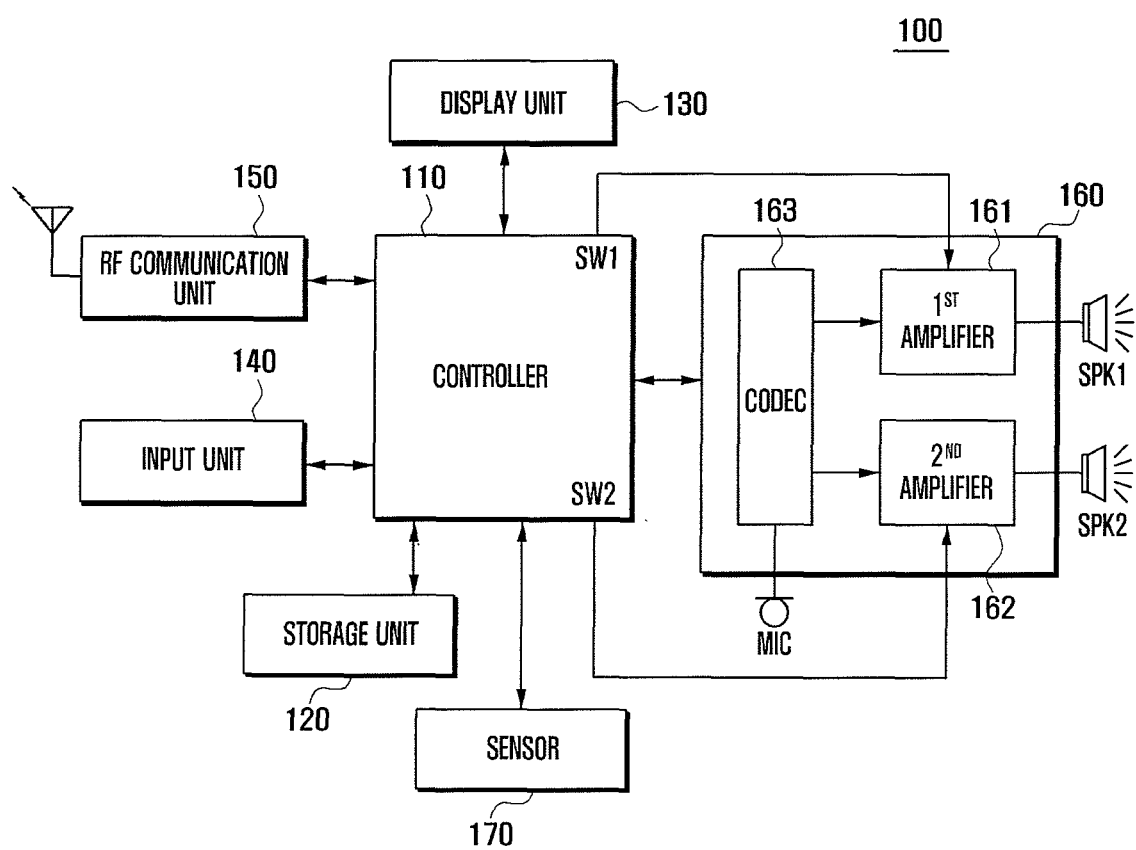
FIG. 2 illustrates a schematic block diagram of a mobile device according to an exemplary embodiment of the present invention.

FIG. 2 illustrates a schematic block diagram of a mobile device according to an exemplary embodiment of the present invention.

Referring to FIG. 2, the mobile device 100 includes a controller 110, a storage unit 120, a display unit 130, an input unit 140, a Radio Frequency (RF) communication unit 150, an audio processing unit 160, a sensor 170, a microphone MIC, a first loudspeaker SPK1, and a second loudspeaker SPK2.

The audio processing unit 160 is connected to the microphone MIC and the loudspeakers SPK1 and SPK2. The audio processing unit 160 receives voice signals from the microphone MIC, converts the received voice signals into digital signals, and transfers the digital signals to the controller 110. The audio processing unit 160 converts digital signals from the controller 110 into analog signals and outputs the analog signals via at least one of the first SPK1 and second SPK2 loudspeakers. In addition, the audio processing unit 160 can output audio signals stored, received by, or created in the mobile device 100, e.g., Moving Picture Experts Group (MPEG)-1 or MEPG-2 Audio Layer 3 (MP3) files, audio signals by playing video files back, etc., to the first SPK1 and second SPK2 loudspeakers. To do this, the audio processing unit 160 may include a first amplifier 161, a second amplifier 162, a CODEC 163, etc.

The first amplifier 161 amplifies audio signals, output from the CODEC 163, and transfers them to the first loudspeaker SPK1. Likewise, the second amplifier 162 amplifiers audio signals, output from the CODEC 163, and transfers them to the second loudspeaker SPK2. The first 161 and second 162 amplifiers may be turned on/off under the control of the controller 110, when making a call in the speakerphone mode. In another exemplary embodiment, the first 161 and second 162 amplifiers may be removed from the audio processing unit 160 when amplification is not needed in audio signals output from the CODEC 163. Alternatively, the first 161 and second 162 amplifiers may be included in the CODEC 163.

The CODEC 163 serves as a coder for encoding voice or video signals into digital signals or a decoder for decoding digital signals into analog signals. The signals may be audio, video, etc. In an exemplary embodiment of the present invention, the CODEC 163 decodes voice signals, transmitted from a counterpart when making a call in the speakerphone mode, into audio signals. The CODEC 163 also encodes audio signals, input via the microphone MIC, and transfers them to the controller 110.

The sensor 170 detects the orientation of the mobile device 100. The orientation of the mobile device 100 may be a landscape orientation when the length of the mobile device 100 is in a horizontal orientation or a portrait orientation when the length of the mobile terminal is in a vertical orientation. The sensor 170 senses a signal corresponding to the landscape or portrait orientation and transfers the sensed orientation to the controller 110. The sensor 170 can be activated when making a call in the speakerphone mode. The sensor 170 may be implemented with one of a tilt sensor, a gravity sensor, an acceleration sensor, a geomagnetic sensor, and a motion sensor, etc., or a combination thereof.

The RF communication unit 150 establishes communication channels for making/receiving calls or for transmitting/receiving data, under the control of the controller 110. The RF communication unit 150 establishes a voice or video call channel, a data communication channel, etc., with a base station. The RF communication unit 150 can transmit/receive voice or video signals to/from the other mobile devices via the voice or video channel, under the control of the controller 110. The RF communication unit 150 includes an RF transmitter for up-converting the frequency of signals to be transmitted and amplifying the signals, an RF receiver for low-noise amplifying received RF signals and down-converting the frequency of the received RF signals, and a multiplexer/demultiplexer for splitting received signals and signals to be transmitted.

The input unit 140 creates signals for inputting numerical or alphabetical information, signals for settings a variety of functions and signals for controlling the functions, and outputs the signals to the controller 110. To do this, the input unit 140 includes keys for receiving the input of numbers and letters and function keys for receiving settings or controlling a variety of functions in the mobile device 100. The function keys may include direction keys, side keys, shortcut keys, etc., which are set to perform specific functions. In an exemplary embodiment of the present invention, the input unit 140 includes a function key for activating a speakerphone function, and a function key for turning on/off the second loudspeaker SPK2 when making a call in the speakerphone mode. The input unit 140 may be implemented with one of a touch pad, a touch screen, a keypad of a general key arrangement, and a QWERTY keypad, or a combination thereof.

The display unit 130 displays menus, user's input information, and information provided to the user. The display unit 140 displays a variety of screens, for example, an idle screen, a menu screen, a message writing screen, a video call screen, etc. In an exemplary embodiment of the present invention, the display unit 130 displays, on one side, images showing that the first SPK1 and second SPK2 loudspeakers are turned on/off when making a call in the speakerphone mode. This allows the user to easily detect whether the call is made in the speakerphone mode using only the first loudspeaker SPK1 or both the first SPK1 and second SPK2 loudspeakers. The display unit 130 may be implemented with a Liquid Crystal Display (LCD), an Organic Light Emitting Diode (OLED), or the like. When the display unit 130 is implemented with a touch screen, the display unit 130 may also serve as an input mechanism.

The storage unit 120 stores an Operating System (OS) for booting the mobile device 100, and application programs required for performing functions, such as an audio playback function, an image or video playback function, etc. The storage unit 120 also stores user data, received data, data to be transmitted, etc. In an exemplary embodiment of the present invention, the storage unit 120 stores a speakerphone application program for turning on/off the first SPK1 and second SPK2 loudspeakers, according to the sensed signal output from the sensor 170, when making a call in the speakerphone mode.

The controller 110 controls the entire operation of the mobile device 100 and signal flows among the components in the mobile device 100. The controller 110 receives a sensed signal output from the sensor 170 when making a call in the speakerphone mode, and activates only the first loudspeaker SPK1 or both the first SPK1 and second SPK2 loudspeakers, according to the sensed signal. The controller 110 receives and analyzes a sensed signal output from the sensor 170 when making a call in the speakerphone mode, and then detects the orientation of the mobile device 100. When the controller 110 ascertains that the mobile device 100 is oriented in the portrait orientation, the controller 110 controls to turn on the first amplifier 161 of the audio processing unit 160 and turn off the second amplifier 162. On the contrary, when the controller 110 ascertains that the mobile device 100 is oriented in the landscape orientation, the controller 110 controls to turn on the first 161 and second 162 amplifiers of the audio processing unit 160. To do this, the controller 110 includes a first control port SW1 for outputting a control signal to turn on/off the first amplifier 161 and a second control port SW2 for outputting a control signal to turn on/off the second amplifier 162. In an exemplary embodiment of the present invention, the first and second control ports SW1 and SW2 may be a General Purpose Input/Output (GPIO). Controlling the first SPK1 and second SPK2 loudspeakers according to the orientation of the mobile device 100 may be retained until the call in the speakerphone mode is terminated.

The controller 110 may activate only the first loudspeaker SPK1 or both the first SPK1 and second SPK2 loudspeakers according to the operation of a function key in the input unit 140, when making a call in the speakerphone mode. The controller 110 can activate only the first loudspeaker SPK1 set as default, when making a call in the speakerphone mode. After that, when the controller 110 receives an input signal created by operating a function key for turning on/off the second loudspeaker SPK2, the controller 110 activates the second loudspeaker SPK2, thereby making a call in a speakerphone mode using the first SPK1 and second SPK2 loudspeakers. Next, when the controller 110 receives the function key again, the controller 110 turns off the second loudspeaker SPK2, thereby making a call in the speakerphone mode using only the first loudspeaker SPK1.

The controller 110 controls the display unit 130 to display, on one side, images showing that the first SPK1 and second SPK2 loudspeakers are turned on/off when making a call in the speakerphone mode.

Although it is not shown in FIG. 2, the mobile device 100 may selectively further include units having add-on functions such as: a camera module for taking pictures or video; a module for short-range wireless communication; a broadcast module for receiving and reproducing broadcasts; an audio source playback module, such as an MP3 module; an Internet communication module for performing communication via the Internet; etc. With the spread of digital convergence, although mobile devices vary too greatly to list their modifications in this description, it will be easily appreciated to those skilled in the art that the other units equivalent to the above-listed units may be further included in the mobile device of an exemplary embodiment of the present invention.

Figure 3:
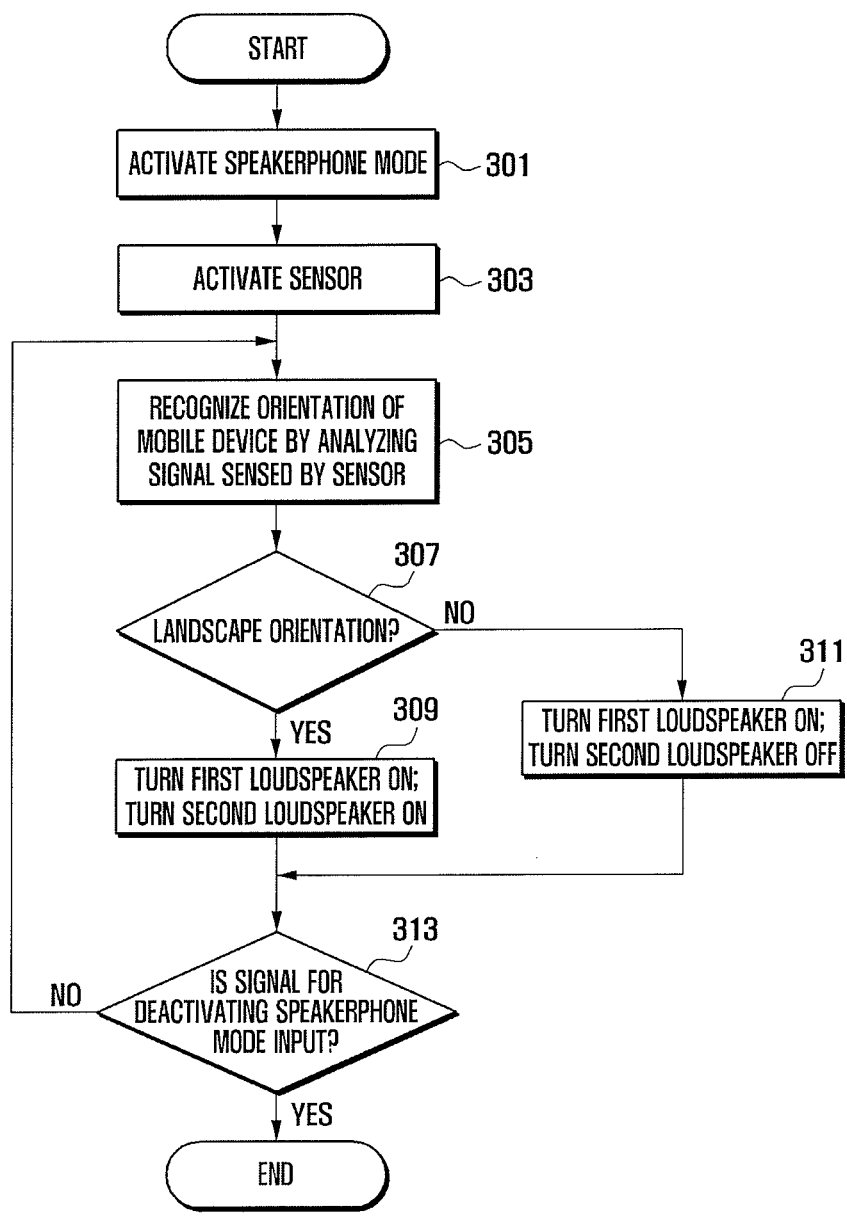
FIG. 3 is a flowchart that describes an a method for making a call in a speakerphone mode in a mobile device, according to an exemplary embodiment of the present invention.

FIG. 3 is a flowchart that describes a method for making a call in a speakerphone mode in a mobile device, according to an exemplary embodiment of the present invention.

Referring to FIG. 3, the controller 110 of the mobile device 100 activates the speakerphone mode according to a user's request at step 301. In the speakerphone mode, the user can make a voice or video call without placing the mobile device 100 next to the ear. The speakerphone mode can be executed by operating a preset shortcut key or a menu. When the speakerphone mode is executed, the controller 110 activates the sensor 170 at step 303. The sensor 170 can sense the orientation of the mobile device 100.

The controller 110 analyzes a signal sensed by the sensor 170 and detects the orientation of the mobile device 100 at step 305. The controller 110 determines whether the mobile device 100 is oriented in the landscape orientation, based on the sensed signal at step 307. When the controller 110 ascertains that the mobile device 100 is oriented in the landscape orientation at step 307, the controller 110 activates both the first SPK1 and second SPK2 loudspeakers at step 309. On the contrary, when the controller 110 ascertains that the mobile device 100 is not oriented in the landscape orientation, i.e., in the portrait orientation, at step 307, the controller 110 turns on the first loudspeaker SPK1 and turns off the second loudspeaker SPK2 at step 311.

After that, the controller 110 determines whether a signal for terminating the speakerphone mode is input at step 313. When the controller 110 ascertains that a signal for terminating the speakerphone mode is not input at step 313, the controller 110 returns to step 305. On the contrary, when the controller 110 ascertains that a signal for terminating the speakerphone mode is input at step 313, the controller 110 terminates the speakerphone mode. When the speakerphone mode is terminated, the controller 110 can deactivate the sensor 170. Terminating the speakerphone mode includes disconnecting a call and switching to a normal mode where the user makes a call by placing the mobile device 100 to the ear.

Figure 4:
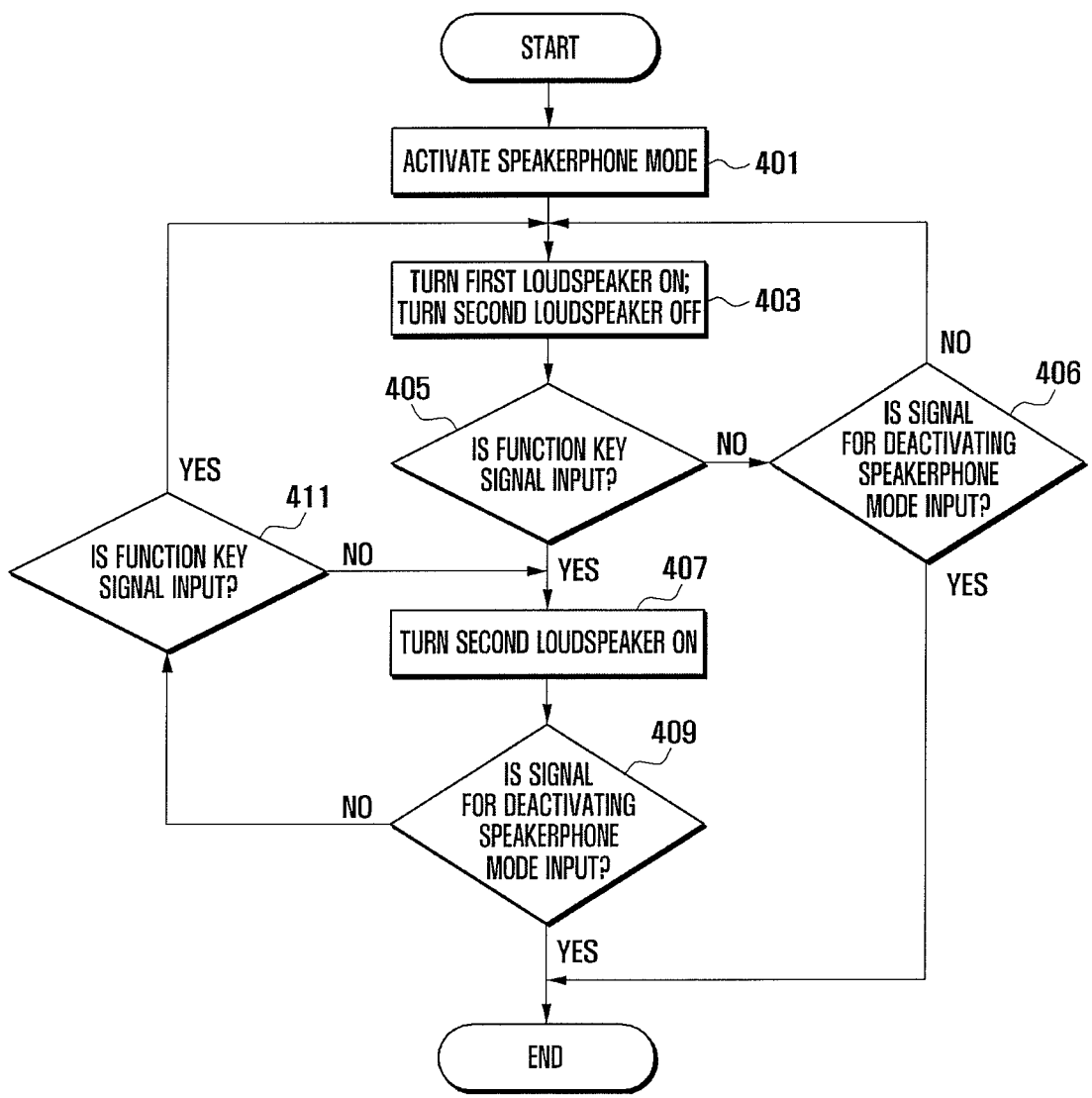
FIG. 4 is a flowchart that describes another method for making a call in a speakerphone mode in a mobile device, according to an exemplary embodiment of the present invention.

FIG. 4 is a flowchart that describes another method for making a call in a speakerphone mode in a mobile device, according to an exemplary embodiment of the present invention.

Referring to FIG. 4, the controller 110 of the mobile device 100 activates a speakerphone mode according to a user's request at step 401. In the speakerphone mode, the user can make a voice or video call without placing the mobile device 100 next to the ear. The speakerphone mode can be executed by operating a preset shortcut key or a menu. When the speakerphone mode is executed, the controller 110 turns the first loudspeaker SPK1 on and turns the second loudspeaker SPK2 off at step 403. This is a default state. After that, the controller 110 determines whether a preset function key is operated to create a signal for turning on/off the second loudspeaker SPK2, for example at step 405.

When the controller 110 ascertains that a preset function key is not operated at step 405, the controller 110 determines whether a signal for terminating speakerphone mode is input at step 406. When the controller 110 ascertains that a signal for terminating speakerphone mode is not input at step 406, the controller 110 reverts to step 403. On the contrary, when the controller 110 ascertains that a signal for terminating speakerphone mode is input at step 406, the controller 110 terminates the speakerphone mode.

Meanwhile, when the controller 110 ascertains that a preset function key is operated at step 405, the controller 110 turns on the second loudspeaker SPK2 at step 407, and then determines whether a signal for terminating speakerphone mode is input at step 409. When the controller 110 ascertains that a signal for terminating speakerphone mode is not input at step 409, the controller 110 determines whether a function key is operated to create a signal at step 411. When the controller 110 ascertains that a function key is operated to create a signal at step 411, the controller 110 returns to step 403.

On the contrary, when the controller 110 ascertains that a function key is not operated to create a signal at step 411, the controller 110 returns to step 407. In that case, the controller 110 holds to activates both the first SPK1 and second SPK2 loudspeakers.

Meanwhile, when the controller 110 ascertains that a signal for terminating speakerphone mode is input at step 409, the controller 110 terminates the speakerphone mode. That is, the controller 110 disconnects a call or makes a call in a normal call mode where the user makes a call by placing the mobile device 100 to the ear.

In the foregoing exemplary embodiments, the methods were described that control the loudspeakers using a function key of the input unit 140 and the sensed signal output from the sensor 170, respectively. However, it should be understood that the present invention is not limited to the exemplary embodiments. For example, the exemplary embodiments may be modified in such a manner that the first SPK1 and second SPK2 loudspeakers can be activated by combining the operation of the function key in the input unit 140 with the sensed signal output from the sensor 170. That is, when the function key is operated in the input unit 140 in a state where the mobile device 100 is oriented in the landscape orientation, i.e., both the first SPK1 and second SPK2 loudspeakers are activated, the controller 110 turns off the second loudspeaker SPK2 and thus makes a call in the speakerphone mode, using only the first loudspeaker SPK1.

As described above, the system and method, according to exemplary embodiments of the present invention, can make a call in a speakerphone mode by activating one or two loudspeakers according to a user's preference or the peripheral environment, thereby enhancing user convenience. That is, the system and method can make a call in a speakerphone mode by activating a number of loudspeakers in a case where a higher volume level is desired although echoes may occur, e.g., a noisy environment, or by activating only one loudspeaker in a relatively silent environment. In particular, the system and method can control a number of loudspeakers based on the orientation of the mobile device or by operating a function key, when making a call in a speakerphone mode, thereby enhancing user convenience.

As described above, the system and method, according to exemplary embodiments of the present invention, can activate all of a number of loudspeakers in a case where the call is made in a speakerphone mode at a higher volume level or only one loudspeaker in a case where a high quality of audio sound is required despite the volume level being low. That is, the system and method can set the number of loudspeakers to be activated according to a user's preference or the peripheral environment, thereby enhancing user convenience.

In addition, the system and method can easily alter the number of loudspeakers to be activated according to the alteration of an orientation of mobile device or a user's operated shortcut key, thereby enhancing user convenience.

While the invention has been shown and with reference to certain exemplary embodiments thereto, it will be understood by those skilled in the art various changes in form and details may be made therein without departing from the spirit and scope of the invention as defined in the appended claims and their equivalents.

What is claimed is:

1. A mobile device for making a call in a speakerphone mode, the mobile device comprising:
    an earpiece loudspeaker;
    a mouthpiece loudspeaker;
    a preset function key configured to be pressed by a user of the mobile device;
    a sensor for detecting an orientation of the mobile device, the orientation of the mobile device comprising a landscape orientation and a portrait orientation; and
    a controller for, when making a call in the speakerphone mode, (i) activating, when the mobile device is oriented in the landscape orientation, both of the earpiece and mouthpiece loudspeakers, (ii) activating, when the mobile device is oriented in the portrait orientation, only the earpiece loudspeaker, and (iii) activating at least one of the earpiece loudspeaker and the mouthpiece loudspeaker, regardless of the detected orientation of the mobile device, when the preset function key has been pressed by the user.

2. The mobile device of claim 1,
wherein the second mouthpiece loudspeaker is disposed closer to the microphone than the earpiece loudspeaker.

3. The mobile device of claim 1, wherein the sensor comprises at least one of an acceleration sensor, a gravity sensor, a geomagnetic sensor, a motion sensor and a tilt sensor.

4. A method for making a call in a speakerphone mode in a mobile device including an earpiece loudspeaker, a mouthpiece loudspeaker, and a preset function key configured to be pressed by a user of the mobile device, the method comprising:
  detecting, when operating in the speakerphone mode, an orientation of the mobile device, the orientation of the mobile device comprising a landscape orientation and a portrait orientation;
  activating, when the mobile device is oriented in the landscape orientation, both of the earpiece and mouthpiece loudspeakers;
  activating, when the mobile device is oriented in the portrait orientation only the earpiece loudspeaker; and
  activating at least one of the earpiece loudspeaker and the mouthpiece loudspeaker, regardless of the detected orientation of the mobile device, when the preset function key has been pressed by the user.

5. The method of claim 4,
wherein the mouthpiece loudspeaker is disposed closer to the microphone of the mobile device than the earpiece loudspeaker.

6. A method for making a call in a speakerphone mode in a mobile device including an earpiece loudspeaker, a mouthpiece loudspeaker, and a preset function key configured to be pressed by a user of the mobile device, the method comprising:
  activating, when operating in the speakerphone mode, both of the earpiece loudspeaker and the mouthpiece loudspeaker prior to detecting an orientation of the mobile device;
  after the activating of both of the earpiece loudspeaker and the mouthpiece loudspeaker and when operating in the speakerphone mode, detecting the orientation of the mobile device, the orientation of the mobile device comprising a landscape orientation and a portrait orientation;
  activating, when the mobile device is oriented in the landscape orientation, the earpiece loudspeaker and the mouthpiece loudspeaker;
  activating, the mobile device is oriented in the portrait orientation, only the earpiece loudspeaker; and
  activating at least one of the earpiece loudspeaker and the mouthpiece loudspeaker, regardless of the detected orientation of the mobile device, when the preset function key has been pressed by the user.

7. The method of claim 6,
wherein the mouthpiece loudspeaker is disposed closer to the microphone of the mobile device than the earpiece loudspeaker.

* * * * *